United States Patent [19]

Ferrari

[11] Patent Number: 4,707,330
[45] Date of Patent: Nov. 17, 1987

[54] ZIRCONIUM METAL MATRIX-SILICON CARBIDE COMPOSITE NUCLEAR REACTOR COMPONENTS

[75] Inventor: Harry M. Ferrari, Edgewood Boro, Pa.

[73] Assignee: Westinghouse Electric Corp., Pittsburgh, Pa.

[21] Appl. No.: 689,733

[22] Filed: Jan. 8, 1985

[51] Int. Cl.⁴ .............................................. G21C 3/00
[52] U.S. Cl. .................................. 376/457; 75/229; 75/236; 376/900; 420/422
[58] Field of Search .................. 75/229, DIG. 1, 236; 376/457, 900; 420/422

[56] References Cited

U.S. PATENT DOCUMENTS

| | | |
|---|---|---|
| 3,775,823 | 12/1973 | Adolph et al. |
| 3,782,924 | 1/1974 | Van Houten |
| 3,920,515 | 11/1975 | Ferrari et al. |
| 4,108,687 | 8/1978 | Armand et al. |
| 4,117,565 | 10/1978 | Asada et al. |
| 4,134,759 | 1/1979 | Yajima et al. |
| 4,141,726 | 2/1979 | Yajima et al. |
| 4,147,538 | 4/1979 | Yajima et al. |
| 4,180,399 | 12/1979 | Asada et al. |
| 4,406,716 | 9/1983 | Khan |
| 4,463,058 | 7/1984 | Hood et al. ........................ 75/229 |
| 4,557,893 | 12/1985 | Jatkar et al. ....................... 419/12 |

OTHER PUBLICATIONS

Sales Brochure of Arco Metals Company, (undated) "Silar, Silicon Carbide Whiskers".

Primary Examiner—Deborah L. Kyle
Assistant Examiner—Richard W. Wendtland
Attorney, Agent, or Firm—Donald M. Satina

[57] ABSTRACT

A metallic composite material and nuclear components such as fuel cladding, rod guide thimbles, grids and channels made therefrom. The metallic composite material comprises 90-60 volume percent of a metal matrix of zirconium or a zirconium alloy containing homogeneously incorporated, throughout the matrix, 10-40 volume percent of silicon carbide whiskers.

21 Claims, 3 Drawing Figures

ZIRCONIUM METAL MATRIX-SILICON CARBIDE COMPOSITE NUCLEAR REACTOR COMPONENTS

Metallic structures that are present in nuclear reactors, such as boiling water reactors and pressurized water reactors must have specific properties. These structures must be formed from a material that is resistant to corrosion in an aqueous environment at elevated temperatures, have a low neutron absorption capacity, and high mechanical strength. In order to provide the requisite properties, the use of zirconium alloy components has been widely accepted. Such zirconium alloys, generally Zircaloy-2 and Zircaloy-4, are commercially available. Even with the use of these alloys, however, problems still exist.

One problem associated with the use of zirconium alloys is their tendency to "creep" or slowly deform, under load, over a period of time. The problem of creeping of the zirconium alloy material exhibits itself in fuel tubes or cladding that is used to contain the nuclear fuel in a reactor. This problem can lead to the disappearance of the desired clearance between fuel pellets and the cladding in which they are contained, and pellet-clad interaction leading to the initiation of cracks in the cladding.

Another problem associated with the use of zirconium alloys in nuclear reactor components is the tendency of articles to "bow" or bend when subjected to long exposure to reactor operating conditions. This bowing for example is a problem with the fuel rods, with rod guide thimbles which are used to contain control rods, and in boiling water reactors with the channels used to direct the coolant through the reactor core. Also, in many water reactors, the grids that are provided to stabilize and prevent vibration of the fuel rods during passage of coolant through the core, have spring-like projections which are subject to irradiation-induced stress relaxation which results in a decrease in spring force, which can cause abrasion or "fretting" of the fuel rod component.

Numerous attempts have been made to enhance the properties of zirconium alloys for use in nuclear reactor components, either by specific mechanical or thermal treatment of the material or alteration of the material. U.S. Pat. No. 3,775,823, for example, teaches a method of producing dispersion-strengthened zirconium products containing fine particles of yttria, magnesia, cerium oxide or beryllium oxide in a matrix of zirconium or a zirconium alloy. The process described in that patent involves mixing of zirconium or a zirconium alloy in a hydrated, powdery state with powder of yttrium oxide, magnesium oxide, cerium oxide or beryllium oxide, and heating the mixture in vacuum for the purpose of expelling hydrogen and for simultaneous or subsequent sintering in a compressed condition, the heating effected at a temperature of below about 800° C. Products prepared by that process, containing dispersed yttria, are described as having substantially higher flow stress and ultimate tensile strength as compared to prior art zirconium alloy articles containing dispersed yttria.

In U.S. Pat. No. 3,782,924, a method is described for making zirconium with inhibited grain growth characteristics, which involves vacuum melting of the zirconium, adding 0.5 to 1.0 percent by weight carbon and stirring, homogenizing, and cooling the material for solidification. The carbon can be added as graphite or as zirconium carbide.

The addition of silicon carbide whiskers to aluminum to form reinforced material, with the silicon carbide whiskers contained in a matrix of aluminum, has been reported and is believed to be close to commercialization. Such metal matrix composites have been described by Atlantic Richfield Co.'s Arco Metal Co. Div. at its Silar operation in Greer, S.C. It has been reported that other metals, including titanium, magnesium, and copper can also be reinforced.

SUMMARY OF THE INVENTION

Metallic components for use in nuclear reactors comprise a composite of 90-60 volume percent of a zirconium matrix which contains, homogeneously incorporated therein, 10-40 percent by volume of silicon carbide whiskers. The whiskers are preferably of a length of about 50-100 microns and have a diameter of about 0.5 microns. Nuclear reactor components, such as channels, fuel rod cladding, rod guide thimbles, and grids are formed from the composite material by conventional forming techniques and exhibit high elastic modulus and strength compared to conventional zirconium-based such components, or if only comparable such properties are desired, the components may be formed as thinner metallic components when compared to conventional zirconium-based such components.

DETAILED DISCLOSURE

Figures 1, 2, 3:
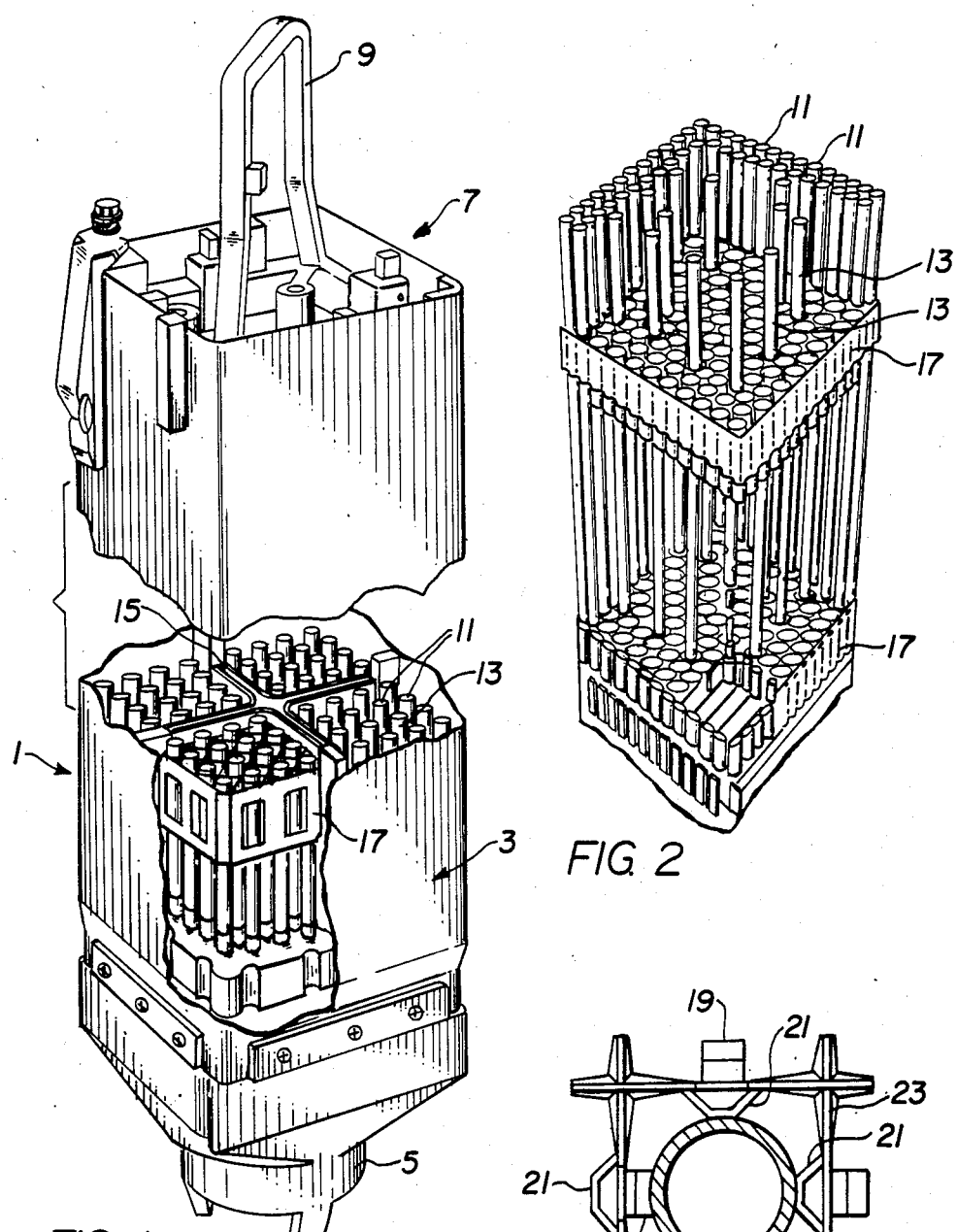
FIG. 1 is a partially cut away, schematic illustration of an embodiment of a nuclear reactor fuel assembly using the composites of the present invention.
FIG. 2 is a schematic illustration of another embodiment of a portion of a nuclear reactor fuel assembly using the composites of the present invention.
FIG. 3 is a plan view illustrating the disposition of a fuel rod and coacting grid straps of the embodiment of FIG. 2.

The present invention relates to zirconium metal matrix-silicon carbide compositions and to nuclear reactor components formed from such compositions.

Nuclear reactor components comprise, among others, fuel rod cladding, rod guide thimbles, grids and channels, used in nuclear fuel assemblies. Such assemblies are illustrated in FIGS. 1 to 3. In FIG. 1, a fuel assembly 1 for a boiling water reactor comprises a generally square shaped flow channel 3 having a bottom inlet nozzle 5 and upper outlet section 7, usually having a handle 9 for placement in a reactor. Contained within the channel 3 are a plurality of fuel rods 11 and interspersed rod guide thimbles 13, positioned in arrays about a cruciform shaped divider 15. The fuel rods 11 comprise hollow sealed tubular rods that contain the nuclear fuel, and the rod guide thimbles comprise tubular members sized to accept control rods for use in controlling the nuclear reaction as desired. The array of fuel rods 11 and rod guide thimbles 13 are stabilized in a spaced relationship to each other by means of grids 17, which are in the form of thin metal strips interwoven in an egg-crate configuration, the interwoven strips having openings in which separate fuel rods and guide thimbles are located. A useful type of grid structure is illustrated in U.S. Pat. No. 3,920,515, assigned to the assignee of the present invention, the contents of which are incorporated by reference herein. In the type of grid structure illustrated in U.S. Pat. No. 3,920,515, and in FIGS. 2 and 3 of the present application, the grids 17 have springs 19 and dimples 21 on the grid straps 23 which project into each opening to properly support and cool the fuel rods near the grid-fuel rod interface. During operation of the reactor, liquid coolant flows upwardly around the fuel rods and through the openings in the grids and discharge at the upper end of the fuel assembly either in a partially vaporized state in boiling water reactors, or in essentially all-liquid state in pressurized water reactors.

The nuclear reactor components of the present invention are produced from a composite that is formed by homogeneous mixing silicon carbide (SiC) whiskers in a zirconium metal matrix and forming the components from said composite.

The metal matrix of the composite can comprise zirconium metal or an alloy or zirconium, containing less than about 5 percent by weight of alloying elements, usable in nuclear reactors. Such zirconium alloys contain additional elements which increase the mechanical properties of zirconium metal or the corrosion resistance of zirconium metal. The elements that are used in the formation of such alloys include niobium, oxygen, tin, iron, chromium, nickel, molybdenum, copper, vanadium and the like. Especially useful alloys are those known as Zircaloy-2 and Zircaloy-4. Zircaloy-2 contains, by weight, about 1.2–1.7 percent tin, 0.07–0.20 percent iron, 0.05–0.15 percent chromium, and about 0.03 to 0.08 percent nickel, the balance being zirconium, while Zircaloy-4 contains, by weight about 1.2–1.7 percent tin, 0.12 to 0.18 percent iron, and 0.05 to 0.15 percent chromium, the balance being zirconium.

According to the present invention, the matrix of zirconium metal or alloy has silicon carbide whiskers homogeneously distributed throughout the matrix. Such silicon carbide whiskers are known and commercially available. The silicon carbide whiskers are present in the zirconium metal or alloy in an amount of about 10 to 40 volume percent of the composite. Less than about 10 percent by volume of silicon carbide whiskers would probably not be enough to give the structural benefits that are desired, while an amount in excess of about 40 percent by volume would be too high an amount of silicon carbide whiskers and would result in a material that could not be sufficiently thermally or mechanically worked, such as by extrusion or pilgering to produce the nuclear reactor components in the desired shapes and sizes.

The silicon carbide whiskers are of a size of about 0.5 microns in diameter and of a length of between about 50 to 100 microns in length, which will enable intimate mixing of the silicon carbide whiskers and powdered zirconium or zirconium alloys and production of a matrix of zirconium or a zirconium alloy with the silicon carbide whiskers homogeneously distributed therethrough. An example of usable whiskers, which are commercially available, are silicon carbide whiskers sold about the trademark SILAR, by Arco Metals Company.

In formation of the composite, a zirconium metal or alloy is provided in powdered form, as a finely divided particulate material less than about 325 mesh, U.S. Standard Sieve. To the powdered zirconium metal or alloy, the silicon carbide whiskers of a size previously defined are added and the two components mixed together to give a homogeneous mixture. The mixture is then formed into billets such as by vacuum hot-pressing, or other conventional processing. The hot-pressing is effected on the homogeneous powder mixture to essentially one hundred percent of theoretical density. Conventional vacuum hot-pressing techniques to achieve such a density would be used. Typically, billets of a size of between 500 to 2000 pounds would be formed, which composite billets can then be processed to form the nuclear reactor components.

The fabrication of the nuclear reactor components from the present composite material would generally use the conventional fabrication steps for formation of such components from conventional zirconium metal or alloys. In the formation of fuel cladding, the tubular shells used to contain the nuclear fuel, or rod guide thimbles, the billet of composite material would be forged and/or extruded to a rod shape. A central axial bore would then be drilled in the rod and the resultant tube shell extruded and then pilgered to the final desired size. In the fabrication of channels or grid strip material, the billet of composite material would be forged and then rolled to the desired thickness. Since the fabrication steps from the composite billets would be substantially identical to those used in the formation of tubular cladding, thimbles, channels or grid strips used when forming such components from conventional zirconium metal or alloy starting materials, conventional existing metal working and fabricating equipment could be used.

It is believed that the present composites of zirconium or zirconium alloy matrix with homogeneously distributed silicon carbide whiskers therein would have an elastic modulus and strength approximately double existing components without such silicon carbide whisker inclusion. Such improved properties would vastly enhance reliability of the nuclear reactor components. Alternatively, components fabricated from the compsites of the present invention, with properties equal to existing components, could be formed having a decreased thickness which would result in a fuel cycle cost savings. The ability to use thinner structural components in boiling water reactors, such as in channels and grids would also increase the flow through the core and reduce the pressure drop across the core which would enable better efficiency and use of smaller reactor unit size.

Under certain conditions, it may be desirable to provide a thin layer of zirconium or zirconium alloy (without the silicon carbide whiskers present in said layer) on either one or both surfaces of the zirconium or zirconium alloy composite for enhanced corrosion resistance. The zirconium alloys of such a layer would be selected from those alloys described for use in the composite. Generally, the thickness of such a layer would be about 15 percent or less of the thickness of the composite.

What is claimed is:

1. In a nuclear reactor having metallic components, the improvement wherein at least one metallic component is a composite metallic component, said composite metallic component comprising a member formed from 90–60 volume percent of a metal matrix of a metal selected from the group consisting essentially of zirconium and a zirconium alloy containing less than about 5 percent by weight of an alloying element, said metal matrix having homogeneously incorporated, throughout said matrix, 10–40 volume percent of silicon carbide whiskers.

2. A composite metallic component as defined in claim 1 wherein said silicon carbide whiskers have a length of between about 50 to 100 microns.

3. A composite metallic component as defined in claim 2 wherein said silicon carbide whiskers are of a diameter of about 0.5 microns.

4. A composite metallic component as defined in claim 1 wherein said zirconium metal matrix consists essentially of zirconium metal.

5. A composite metallic component as defined in claim 1 wherein said zirconium metal matrix consists essentially of a zirconium alloy.

6. A composite metallic component as defined in claim 5 wherein said zirconium alloy contains at least one alloying element selected from the group consisting of niobium, oxygen, tin, iron, chromium, nickel, molybdenum, copper and vanadium.

7. A composite metallic component as defined in claim 6 wherein said zirconium alloy is Zircaloy-2.

8. A composite metallic component as defined in claim 6 wherein said zirconium alloy is Zircaloy-4.

9. A composite metallic component (for use in nuclear reactors) as defined in claim 1 wherein said component has, on a surface thereof, a layer of a zirconium material selected from the group consisting of zirconium or a zirconium alloy.

10. A composite metallic component (for use in nuclear reactors) as defined in claim 9 wherein a said layer is provided on both surfaces of said composite metallic component.

11. In a nuclear reactor containing metallic components including at least one of fuel cladding, control rods, rod guide thimbles, grids and channels, the improvement wherein said at least one of said metallic components is formed from a metallic composite comprising 90–60 volume percent of a metal matrix of a metal selected from the group consisting essentially of zirconium and a zirconium alloy containing less than about 5 percent by weight of an alloying element, said metal matrix having homogeneously incorporated, throughout said matrix, 10–40 percent by volume of silicon carbide whiskers.

12. In the nuclear reactor defined in claim 11, the improvement wherein said at least one metallic component are a plurality of fuel claddings.

13. In the nuclear reactor defined in claim 11, the improvement wherein said at least one metallic component are a plurality of control rods.

14. In the nuclear reactor defined in claim 11, the improvement wherein said at least one metallic component are a plurality of guide thimbles.

15. In the nuclear reactor defined in claim 11, the improvement wherein said at least one metallic component are a plurality of grids.

16. In the nuclear reactor defined in claim 11, the improvement wherein said at least one metallic component are a plurality of channels.

17. In the nuclear reactor defined in claim 11, the improvement wherein said silicon carbide whiskers have a length of between 50 to 100 microns.

18. In the nuclear reactor as defined in claim 17, the improvement wherein said silicon carbide whiskers are of a diameter of about 0.5 microns.

19. In the nuclear reactor as defined in claim 11, the improvement wherein said zirconium metal matrix is a zirconium alloy containing at least one alloying element selected from the group consisting of niobium, oxygen, tin, iron, chromium, nickel, molybdenum, copper and vanadium.

20. In a nuclear reactor as defined in claim 11, the improvement wherein a layer of a zirconium material selected from the group consisting of zirconium or a zirconium alloy is provided on a surface of said metallic composite.

21. In a nuclear reactor as defined in claim 20, the improvement wherein a layer of a zirconium material selected from the group consisting of zirconium or a zirconium alloy is provided on both surfaces of said metallic composite.

* * * * *